United States Patent [19]

Davis et al.

[11] Patent Number: 4,579,665
[45] Date of Patent: Apr. 1, 1986

[54] METHOD FOR CONTROLLING MOLLUSKS

[75] Inventors: Dwight P. Davis, Newtown, Pa.; Larry A. Lyons, Woodbury, N.J.

[73] Assignee: Betz Laboratories, Inc., Trevose, Pa.

[21] Appl. No.: 765,622

[22] Filed: Aug. 14, 1985

[51] Int. Cl.$^4$ .............................................. C02F 1/50
[52] U.S. Cl. .................................. 210/755; 210/764
[58] Field of Search .............................. 210/753–755, 210/764, 765; 43/124

[56] References Cited

U.S. PATENT DOCUMENTS

| | | | |
|---|---|---|---|
| 3,524,812 | 8/1970 | Shema et al. | 210/63 |
| 3,574,697 | 4/1971 | Welcher | 210/764 X |
| 3,871,860 | 3/1975 | Manowitz | 210/755 X |
| 3,898,343 | 8/1970 | Shema et al. | 210/63 |
| 4,328,638 | 5/1982 | Smithson | 43/124 |
| 4,462,914 | 7/1984 | Smith | 210/755 |

OTHER PUBLICATIONS

"Bivalve Fouling of Nuclear Power Plant Service-Water Systems", U.S. Nuclear Regulatory Commission 1984 Report.
"Freshwater Macrofouling and Control with Emphasis on Corbicula", Dec. 1983 Proceedings of Electric Power Research Institute.
"Clams—A Growing Threat to Inplant Water Systems", Plant Engineering, Jun., 1979, p. 165.
"Interactions of Corbicula sp with Power Plants", Mattice, J. S., 1979, pp. 119–138 in: Proceedings, First International Corbicula Symposium, J. C. Britton (ed), Texas Christian University Research Foundation, Fort Worth, Texas, 313 pages.
"Control Studies on Corbicula for Steam Electric Generating Plants", Goss, L. B. et al., 1979, in: Proceedings, First International Corbicula Symposium, J. C. Britton (ed), Texas Christian University Research Foundation, Fort Worth, Texas, 313 pages.
"What are we doing about the Asiatic Clam?", Power, Jan. 1982.
Preamble to Steam Electric Power Generating Point Source Category Effluent Limitation Guidelines (47 FR 52290).
"Corbicula Variation and Dreissena Parallels", The Biologist, vol. 53, No. 3, Aug. 1971, pp. 153–159.
"Thermal Tolerance of the Adult Asiatic Clam Corbicula Manilensis," Mattice & Dye, Proceedings of Second Thermal Ecology Symposium, Apr. 1975.
"Procedures for Evaluating Chemical Control of Larval Asiatic Clams", Foster & Bok.
Untitled paper (18 pages) on "Asiatic Clams . . . " with Bibliography.

*Primary Examiner*—Thomas Wyse
*Attorney, Agent, or Firm*—Alexander D. Ricci; Bruce E. Peacock; James D. Dee

[57] ABSTRACT

A method of controlling the fouling potential of mollusks in aqueous systems which comprises adding to the system an effective controlling amount of a nitrostyrene compound and an alkyl thiocyanate compound.

14 Claims, No Drawings

METHOD FOR CONTROLLING MOLLUSKS

BACKGROUND OF THE INVENTION

This invention relates to the control of fouling by mollusks in aqueous systems by utilizing a nitrostyrene compound and an alkyl thiocyanate compound.

More particularly, this invention relates to control of potential mollusk fouling in cooling systems for both industrial plants and utilities which are subject to such fouling, whether the system is using cooling water on a once-through basis or is of the recirculating type. The once-through systems operate by drawing cooling water through the process to be cooled on a one-time basis and discharge the water directly to the receiving body with a short residence time (usually minutes to hours), whereas recirculating cooling systems require the addition of only a fraction of the system volume as make-up water. Additionally, the service water systems (waste, safety and auxiliary cooling) which are often a part of these cooling systems are also quite vulnerable to mollusk fouling, primarily because they do not run continuously, the conduits are of a smaller diameter, and more time is allowed for mollusk growth.

Mollusks are among the broad range of macroinvertebrates which can cause macrofouling problems to marine and fresh water cooling systems. Macrofouling by mollusks, like other groups of macrofouling macroinvertebrates—barnacles, bryozoans, sponges, hydroids, tunicates and annelids—is initiated by the settlement or attachment of larval and/or juvenile stages that are easily entrained by the service waters of cooling systems.

Fouling caused by the settlement, attachment and/or biogrowth of the mollusks in the cooling systems and associated service water systems of the industrial plants and utilities which utilize large quantities of water is a major problem causing a variety of deleterious effects to the structure, operation and safety of these systems. As indicated in the U.S. Nuclear Regulatory Commission 1984 Report entitled "Bivalve Fouling of Nuclear Power Plant Service—Water Systems", the safe operation of a nuclear power plant is a concern because of fouling caused by the Asiatic clam (*Corbicula fluminea*), the blue mussel (*Mytilous edulis*) and the American oyster (*Crassostrea virginica*). This report describes the correlations between the biology of these bivalve mollusks and the design and operation of power plants that allow bivalves to enter and reside within their cooling water systems.

The extent and type of mollusk fouling will depend upon many factors such as the source of the cooling water, the season, the water temperature, the growth rate of the fouling mollusk, and the linear velocity of the cooling water. Because of the large quantities of cooling water used, the locality of the plant will dictate the water's source. A fresh water cooling system will be drawing from a river, lake or well, whereas plants situated along coastal areas will most likely utilize brackish or marine water for their systems.

Both once-through and recirculating types of cooling water are treated prior to entering the system by screening to remove objects which are large enough that they could damage pumps and heat exchange equipment. This screening does not prevent the passage of the early life-stages or larval stages of the mollusks, which are the precursors to fouling as growth conditions are usually favorable within these systems. These early life stages of the mollusks will settle out in low flow areas or attach to substrate within the cooling system and grow to mature organisms.

One of the species of mollusks controlled by the method of this invention is the Asiatic clam, Corbicula spp. As indicated in the article entitled "Freshwater Macrofouling and Control with Emphasis on Corbicula" in the December 1983 Proceedings of the Electric Power Research Institute (EPRI), the Asiatic clam has caused significant incidents of macrofouling to fresh water cooling systems of power plants. Another freshwater mollusk, Dreissena spp—the Zebra mussel, causes fouling problems in Europe to cooling systems in a similar manner as the Asiatic clam. Both Drissena and Corbicula have free floating planktonic veliger larvae which allow easy penetration into cooling systems. Similar macrofouling problems plague cooling systems using estuarine or marine waters, but with different species of mollusks.

As a specific example of how a mollusk can cause fouling problems, a description of some characteristics of the Asiatic clam follows:

One-year-old clams are capable of plugging valves and nozzles. Two-year-old clams can cause mechanical damage to impellers and other moving parts of water-distribution systems. At six years, the clam can damage tires of construction vehicles. As in all other clams, growth is rapid in early years and then tapers off. "Clams—A Growing Threat to Inplant Water Systems", *Plant Engineering*, June, 1979, p. 165.

The Asiatic clams are very tolerant of many chemicals and often occur in great abundance. They have accumulated to depths of two meters in the Delta-Mendota Canal in California and have caused reduction in water flow. Some industrial plants have had difficulty obtaining fire insurance after inspectors found the fire protection systems plugged with Corbicula shells. Pump impellers have been damaged by shells in some industrial plants. The number of power plants which have experienced problems with this species has been steadily increasing during the past several years. Problems in fossil-fueled power plants most often relate to pluggage of condenser tubes, surface water heat exchangers, and blockage of fire protection systems. In addition to these problems, nuclear power plants may have other problems associated with the shutdown service water, and emergency reactor cooling systems.

For further information, see also Mattice, J. S., 1979. "Interactions of Corbicula sp with Power Plants", pages 119–138 and Goss, L. B. et al., 1979, "Control Studies on Corbicula for Steam Electric Generating Plants", pages 139–151, in J. C. Britton (ed), Proceedings, First International Corbicula Symposium, Texas Christian University Research Foundation, Fort Worth, Texas, 313 pages.

Fouling control of mollusks has been attempted using physical/mechanical and chemical techniques, but no foolproof combination has been developed. For example, chlorine, which has been by far the most used biofouling control agent, has several limitations: prolonged exposures are required to achieve efficacy, chlorine demand of the cooling water reduces its potency, and strict environmental regulations are being imposed which act to severely limit the discharge of chlorine residues, and in some cases seek to eliminate its use altogether.

In addition to chlorine, Smith, U.S. Pat. No. 4,462,914 discloses the use of a high density cationic polymer to control Corbicula. While the polymer appears to be efficacious toward the adult clam after a six day exposure period, it suffers from some of the same drawbacks as chlorine.

The above-mentioned concerns over potential fouling biocides is well described by the following excerpt from the December 1983 *Proceedings of the Electric Power Research Institute:*

"Chemical controls have an inherent liability. What can kill inside the power plant may also impact the receiving water body: chemical toxicants are not specific. The perfect chemical would be stable enough to be effective inside the plant, but become non-toxic, via chemical reaction or decay, before or as it entered the receiving water body. So far, no chemical meets these specifications: chlorine and bisulfate/sulfide which have actually been used in an attempt to control Corbicula fouling have not been effective alone or have been successful only under limited conditions. Such a chemical may not exist, but scheduling of application of a chemical at the beginning of scheduled outages may offer a less stringent alternative, because of the possibility of extending holdup times".

The compounds of the present invention have been utilized for control of microorganisms, i.e., bacteria, fungi, and algae, but have not been suggested for control of larger, more complex organisms, especially mollusks. See, e.g., U.S. Pat. No. 3,898,343. Bacteria, fungi and algae microorganisms are dependent upon the presence of metabolizable components in an aqueous system. However, the presence or absence of mollusks is essentially independent of the presence of metabolizable components in the water because they are a much more complex organism than the microorganisms, both in terms of anatomic and physiological complexity and position in the food chain. Mollusks are unable to exist on metabolizable components. Rather, mollusks require small plants or animals as foodstuff. Until the unexpected discovery of the applicants, the use of the compounds of the present invention have never before been appreciated to control mollusks.

Description of the Invention

The present inventors discovered that the survival of veliger stage mollusks and adult mollusks in a laboratory test system could be significantly impaired by adding to the system a sufficient amount for the purpose (depending upon the severity or potential severity of the problem) of a combination of an effective nitrostyrene compound and an effective alkyl thiocyanate compound. (The treatment may range from about 0.1 to 1000 parts of each compound to a million parts of the aqueous system to be treated (ppm)). Veliger stage and adult mollusks which are particularly affected by the compound are the asiatic clams, more specifically Corbicula spp.

The compounds which in combination have been found to be effective are the bromonitrostyrene (and in particular the beta-bromo-beta-nitrostyrene) and the alkyl thiocyanate (and in particular the methylene bis thiocyanate).

For example, it is believed that adding the nitrostyrene and alkyl thiocyanate compounds, in an effective amount to the incoming water of a once-through cooling system to destroy the planktonic juveniles before such settle and form the adult clam or mollusks, does provide quite adequate inhibition of clam infestation and the consequent encrustation of the structural parts of the cooling water system. Furthermore, it is believed that by extending the treatment applications at effective amounts of these combined agents, the destruction of adult clams could also be accomplished to eradicate fouling problems of a more mature nature.

While other biocidal materials do have some efficacy, e.g., chlorine, chlorophenates, cationic polymers, and the like, these chemicals are quite persistent and the discharge of waters containing these chemicals back into the receiving stream is subject to regulatory review since each provides its own pollution and/or contamination problems. The present inventors, in reviewing the asiatic clam problem, were attempting to discover chemicals which would not only be effective in controlling mollusks but which would either decompose upon use to less toxic materials and therefore be dischargeable to receiving streams without drastically effecting the ecology thereof, or be readily neutralizable into relatively safe daughter products. The present inventors found the combination of biocidal agents of bromonitrostyrene and alkyl thiocyanate to, in fact, provide all of these properties.

SPECIFIC EMBODIMENTS OF THE INVENTION

Discussion:

The following documents the results of an efficacy assessment of Betz ® Slimicide C-41 as a mollusk control agent. The planktonic juvenile stages of the Asiatic clam and the adult Asiatic clam, *Corbicula fluminea,* were the target organisms of the study.

Slimicide C-41 is a broad spectrum biocide marketed by Betz Laboratories, Inc. The active biocidal agents of the product are beta-bromo-beta-nitrostyrene (BNS) at a concentration of 9.2% by weight and methylene bis thiocyanate (MBT) at a concentration of 4.9% by weight, with the remaining 85.9% being hydrocarbon solvent and stabilizing agents. The product has been registered for use against algae, bacteria, and fungi in recirculating cooling water systems, once-through cooling systems, heat exchangers, influent systems, and water scrubbing systems. This product is a particularly good candidate for once-through cooling water applications where Asiatic clam problems are commonly experienced because of the natural propensity of both active agents (BNS and MBT) to hydrolyze quickly to less toxic products and the susceptibilities of BNS to detoxification by use of various oxidizing agents (U.S. Pat. No. 3,524,812). For this reason, and because of the known efficacy of BNS as a molluscicidal agent against planktonic, entrainable larvae stage Corbicula (U.S. patent application Ser. No. 638,595 filed Aug. 7, 1984), Slimicide C-41 was examined for efficacy as a molluscicidal agent.

Materials and Methods

Naturally spawned veliger larvae were collected from adult Corbicula, which were collected from a tributary of the Delaware River, Mercer County, N.J. Larvae released by the gravid clams during the 24 to 48 hour period following collection were transferred to culture dishes until testing was initiated. The larvae being released during this period were microscopically examined and confirmed to be in the early veliger stages: velum present with flagellum, apical swim plate present, reduced bivalve shell that partially covered the velum. Early stage veliger larvae were examined for viability by ciliary activity before being used for testing. Those early stage veliger larvae being maintained in the culture dishes and not used for initial testing developed into the late stage veliger larvae during a 3 to 6 day culturing period. Late stage veliger larvae were confirmed by microscopic examination with the possession of a fully developed foot, a completely developed bivalve shell encasing all soft body tissues, and a reduced or absent velum. Only late stage veliger larvae exhibiting active foot and shell movements and ciliary activity were retained for testing.

Static acute bioassays were conducted with Slimicide C-41 using early stage veligers and late stage veligers. The concentrations of Slimicide C-41 examined in each test were 5, 10, 20, 25, 50 and 100 ppm, spanning the application rjange employed in recirculating and once-through water systems. Boerner glass microslides were used as the test containers. Four replicate slide cells were used with each test solution. Approximately 40 to 60 larvae were distributed into the four replicate cells containing either control diluent or a toxicant solution. The larvae were immediately examined and counted upon being transferred to the cells. Mortality counts were made at 1, 3, 6 and 24 hours during the exposure periods. Mortality counts were corroborated by an independent observer. Mortality was defined as the cessation of cilia and body movements and the necrosis of the body tissues. Microscopic examinations for mortality determinations were made using a compound microscope at 40X to 100X power. During testing, the Boerner microslides were stored in airtight plastic trays above a shallow layer of water to prevent evaporation of the test solutions.

Adult Corbicula, ranging in size from 1 cm to 2.5 cm, were acclimated in the laboratory for several weeks. Adult clams were fed a daily diet of laboratory cultured algae and supplied with fresh diluent water daily. Only a few of the several hundred clams being cultured expired during the acclimation period.

A static renewal bioassay was conducted with Slimicide C-41 on the adult clams. Concentrations of Slimicide C-41 at 10, 15, 25, 50 and 100 ppm were examined. Glass 5 liter aquaria were used as the test containers. Two replicate aquaria were used for each test solution. Twelve adult clams were placed into each of the tanks containing diluent water or toxicant. All solutions, with the exception of the 100 ppm test solutions, were renewed 5 times at intervals during a 72 hour exposure period. After the exposure period, a recovery period of 72 hours was employed by continuously supplying all test vessels with only diluent water. Mortality responses were observed at 24, 42, 48, 66, 72 and 144 hours. Mortality is defined as the pcint in time when the bivalve shell of the adult clam gapes open from the relaxed muscle tissue of the expired clam. All clams that were not actively siphoning at the end of the recovery period were opened up for microscopic examination to determine their viability or mortality. All clams were confirmed viable by the actively beating cilia lining the gill epithelium.

The diluent water used in testing and culturing was the combined municipal and well water sources which was dechlorinated through activated carbon filtration and heavily aerated. This water is of suitable quality for continuous culture of the Cladoceran species *Daphnia magna* and has been demonstrated to be capable of adequately sustaining the larval clams. During the testing periods, only 1% mortality of the late stage veligers and 10% mortality for the more vulnerable, non acclimated, early stage veligers were witnessed in the control groups.

Results and Discussion

The results of the experimental data are summarized in tables 1 to 3. The mortality values presented are percentages of the total number of individuals.

Slimicide C-41 at the concentrations tested produced a graduated dose response that was quite pronounced for most of the time exposures for each of the Corbicula life stages—early veliger stage, late veliger stage and adult clam. There was some variability of dose responses at the lesser time exposures for the late stage veligers, but this variability would be contributed to the temporary avoidance mechanism of this larval stage to "clam-up" from the external media with the completely developed bivalve shell. However, the 24 hour exposure observation produced a defined dosage response. It is interesting to note that this avoidance mechanism of "clamming-up" from the toxicant becomes even more pronounced with the adult clams by the extended exposure periods required to achieve efficacy.

Mortality responses based upon toxicant concentration were directly related to the particular Corbicula life stage being tested. The early veliger stage larvae demonstrated were the most vulnerable to the lowest toxicant dosages (5 and 10 ppm). The late stage veliger larvae were more resistant to toxicant exposure but significant efficacious control (>50% mortality) was achieved at all toxicant concentrations from 20 ppm to 100 ppm. Likewise, significant efficacious control of the adult clams was also achieved at levels from 25 ppm to 100 ppm.

The time exposure or the reaction time to achieve efficacy was also directly related to the Corbicula life stage. It should definitely be noted that in spite of different exposure times between the life stages, the susceptibility of all life stages to short exposure times would be considered promisingly high. Exposure times for achieving significant levels of efficacy at 25 ppm ranged from 1 hour with the early stage veligers to 24 hours with the late stage veligers to 48 hours with adult clams.

It should further be noted that the efficacious control is anticipated to be even greater when the target organisms are subjected to dynamic product exposures. Both active agents (BNS and MBT) have known chemical degradation rates with half-lives that occur within a few hours (Friend and Whitekettle, 1980). The degradation products of these active agents have considerably reduced toxicity effects. The product exposure periods examined in this study have at the very minimum overlapped this decay period, which theoretically should have a diminutive effect on the mortality estimates generated. That is, if fresh toxicant were to be continuously fed to the system during the exposure period, an increase in the toxicity, or mortality would be expected.

SUMMARY OF EXPERIMENTAL DATA

TABLE 1

| Early Veliger Stage Corbicula Larvae | | | | |
|---|---|---|---|---|
| | Cumulative Percent Mortality[a] | | | |
| Product Concentration | Observation Time (hrs.) | | | |
| (ppm of Slimicide C-41) | 1 | 3 | 6 | 24 |
| 0 | 0 | 0 | 0 | 10 |
| 5 | 2 | 7 | 20 | 87 |

TABLE 1-continued

Early Veliger Stage Corbicula Larvae

| Product Concentration | Cumulative Percent Mortality[a] Observation Time (hrs.) | | | |
|---|---|---|---|---|
| (ppm of Slimicide C-41) | 1 | 3 | 6 | 24 |
| 10 | 8 | 31 | 52 | 100 |
| 20 | 20 | 75 | 89 | 100 |
| 25 | 85 | 92 | 100 | — |
| 50 | 100 | — | — | — |
| 100 | 100 | — | — | — |

TABLE 2

Late Veliger Stage Corbicula Larvae

| Product Concentration | Cumulative Percent Mortality[a] Observation Time (hrs.) | | | |
|---|---|---|---|---|
| (ppm of Slimicide C-41) | 1 | 3 | 6 | 24 |
| 0 | 0 | 0 | 0 | 1 |
| 5 | 0 | 8 | 14 | 24 |
| 10 | 0 | 0 | 4 | 30 |
| 20 | 9 | 18 | 24 | 68 |
| 25 | 2 | 13 | 15 | 79 |
| 50 | 6 | 23 | 47 | 100 |
| 100 | 3 | 77 | 95 | 100 |

TABLE 3

Adult Clams (Corbicula fluminea)

| Product Concentration | Cumulative Percent Mortality[a] Observation Time (hrs.) | | | | | |
|---|---|---|---|---|---|---|
| (ppm of Slimicide C-41) | 24 | 42 | 48 | 66 | 72 | 72[b] |
| 0 | 0 | 0 | 0 | 0 | 0 | 0 |
| 10 | 0 | 0 | 4 | 8 | 8 | 21 |
| 15 | 0 | 4 | 8 | 21 | 25 | 37 |
| 25 | 0 | 33 | 62 | 75 | 75 | 79 |
| 50 | 4 | 67 | 83 | 87 | 87 | 92 |
| 100 | 100[c] | — | — | — | — | — |

[a]Mortality values given as means of independent replicate counts.
[b]Mortality counts following 72 hours recovery in diluent water.
[c]100% mortality within 18 hours. Test solution was not renewed during exposure period.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What we claim is:

1. A method for controlling the fouling potential of mollusks in an aqueous system which comprises adding to said system an effective controlling amount of an effective nitrostyrene compound and an effective alkyl thiocyanate compound.

2. A method according to claim 1, wherein said mollusks are Asiatic clams.

3. A method according to claim 2, wherein said aqueous system is the aqueous system of a cooling water system.

4. A method according to claims 1, 2, or 3, wherein said nitrostyrene compound is bromonitrostyrene and said alkyl thiocyanate compound is methylene bisthiocyanate.

5. A method according to claim 4, wherein said nitrostyrene compound is beta-bromo-beta-nitrostyrene.

6. A method for controlling the fouling potential of mollusks in an aqueous system which is prone to such fouling which comprises adding to said system a sufficient amount of an effective combination of a nitrostyrene compound and an alkyl thiocyanate compound to substantially destroy the planktonic juveniles of said mollusks.

7. A method according to claim 6, wherein said mollusks are comprised primarily of Corbicula.

8. A method according to claim 7, wherein said aqueous system is the aqueous system of a cooling water system.

9. A method according to claims 6, 7, or 8, wherein said nitrostyrene compound is bromonitrostyrene and said alkyl thiocyanate is methylene bisthiocyanate.

10. A method according to claim 9, wherein said nitrostyrene compound is beta-bromo-beta-nitrostyrene.

11. A method of assuring that the flow of water through a cooling water system is not impeded or curtailed due to the growth and proliferation of mollusks without significant attendant contamination of waters discharged from said cooling water system which comprises feeding to the incoming water to said system a sufficient amount of an effective combination of a nitrostyrene compound and an alKyl thiocyanate compound to destroy any planktonic juveniles of said mollusks which may be contained in said incoming water.

12. A method according to claim 11, wherein the mollusk is Corbicula.

13. A method according to claims 11 or 12, wherein said nitrostyrene compound is bromonitrostyrene and said alkyl thiocyanate is methylene bisthiocyanate.

14. A method according to claim 13, wherein said nitrostyrene compound is beta-bromo-beta-nitrostyrene.

* * * * *